United States Patent [19]
Kliewer et al.

[11] Patent Number: 5,637,807
[45] Date of Patent: Jun. 10, 1997

[54] AUTOMATED GRAM LOAD TESTING SYSTEM FOR A HEAD STACK ASSEMBLY

[75] Inventors: Michael Kliewer, Livermore; Robert Neimeyer, San Jose; Michael Chadd, Milpitas, all of Calif.

[73] Assignee: Quantum Corporation, Milpitas, Calif.

[21] Appl. No.: 584,510

[22] Filed: Jan. 11, 1996

[51] Int. Cl.[6] ............................................. G01L 1/00
[52] U.S. Cl. ............................................. 73/862.541
[58] Field of Search ..................... 73/862.541, 862.632, 73/862.639, 862, 862.041, 862.05, 432.1; 360/104, 105, 97.01, 99.06, 137

[56] References Cited

U.S. PATENT DOCUMENTS

| | | | |
|---|---|---|---|
| 4,535,374 | 8/1985 | Anderson et al. | 360/103 |
| 4,661,873 | 4/1987 | Schulze | 360/105 |
| 4,703,376 | 10/1987 | Edwards et al. | 360/105 |
| 4,787,000 | 11/1988 | Schulze | 360/105 |
| 5,023,737 | 6/1991 | Yaeger | 360/105 |
| 5,341,689 | 8/1994 | Freudenberger | 73/862.541 |
| 5,476,015 | 12/1995 | Valent | 73/862.541 |

*Primary Examiner*—Elizabeth L. Dougherty
*Attorney, Agent, or Firm*—John C. Chen

[57] ABSTRACT

An automated system for measuring gram load in a head suspension arm of a disk drive. The system is utilized during the assembly of a disk drive, and is operated in an automated mode without requiring manual assistance. The system includes an apparatus for placing each suspension arm into position to measure the gram force, a controller for driving the apparatus in an automated mode, an instrument for measuring the gram load of each suspension arm, and a computer for storing data from the measuring instrument. The apparatus includes a plurality of vertically-aligned cam pins which meshably engage the plurality of vertically-aligned suspension arms. Each of the cam pins separates a pair of adjacent arms and includes an end defined by a semi-circular cross-section. As each cam pin is rotated by servo motors, each arm is placed into a preloaded biased state, enabling the measuring means to measure its gram load. The process of measuring each suspension arm is executed in an automated mode which significantly reduces operator involvement.

15 Claims, 7 Drawing Sheets

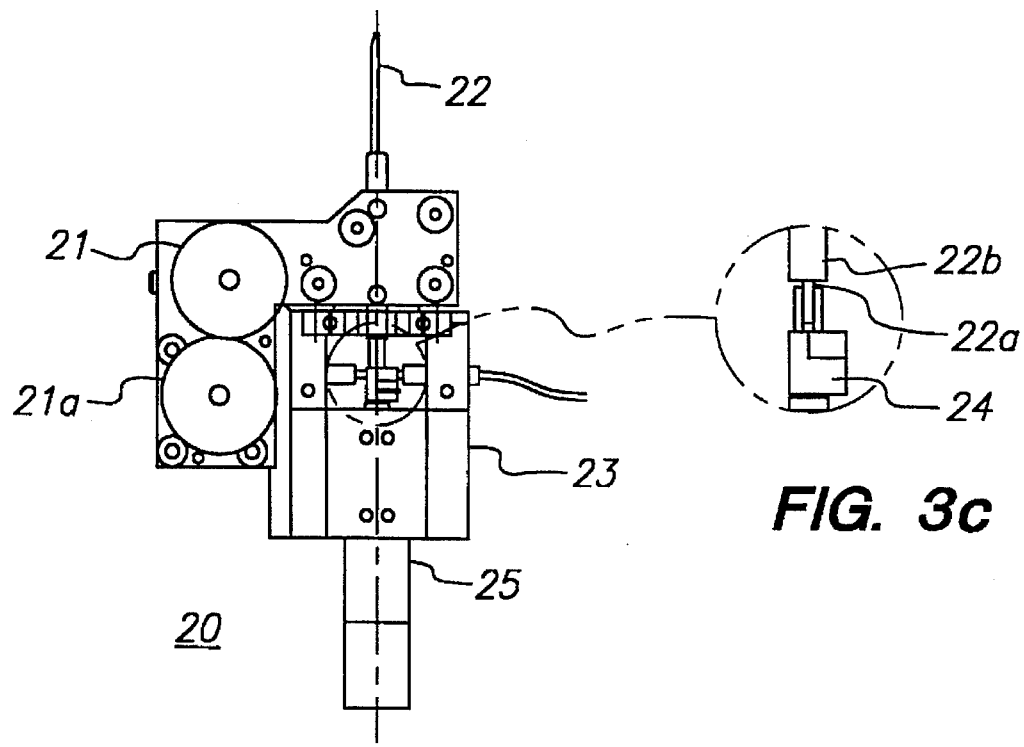
FIG. 3c
FIG. 3a
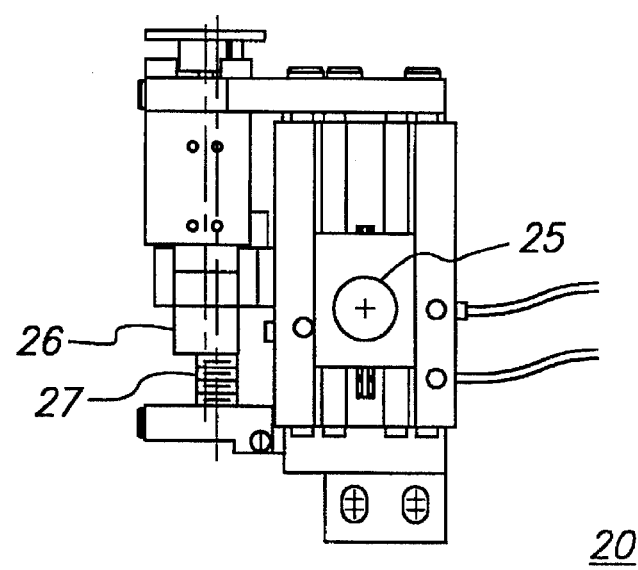
FIG. 3b

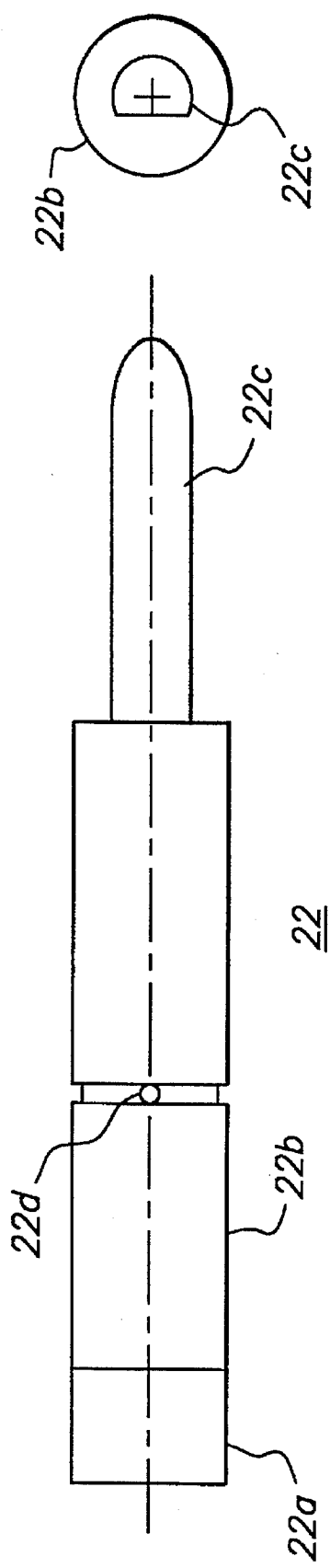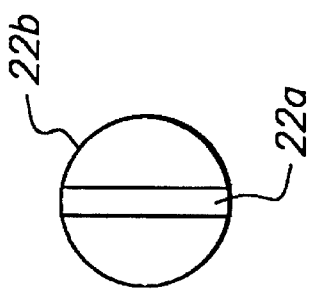
FIG. 4b
FIG. 4a
FIG. 4c

AUTOMATED GRAM LOAD TESTING SYSTEM FOR A HEAD STACK ASSEMBLY

FIELD OF THE INVENTION

This invention relates to head suspension arms in a disk drive. More specifically, this invention relates to an automated system for measuring the gram load of head suspension arms in a head stack assembly (HSA) of a disk drive.

BACKGROUND OF THE INVENTION

Typical hard disk drives include one or more vertically-aligned rotating information storage disks, each having a pair of associated magnetic read/write transducers, or heads, adapted to transfer information between the disk and an external computer system. One of the heads communicates with the upper surface of the disk, while the other head communicates with the lower surface of the disk. The information storage disks are journaled about a spindle motor assembly capable of rotating the disks at high speeds. In conventional disk drives, the read/write heads are carried by a plurality of vertically-aligned resilient metal blades, each commonly known as a head suspension arm. Each head is attached by a gimbal mechanism to a slider, which is in turn secured, e.g. by epoxy, to a planar surface of the head suspension arm's end. The plurality of suspension arms and heads are carried by an E-block actuator, which is in turn coupled to a precision assembly of bearings and a shaft. Typically, the E-block is constructed of die cast aluminum alloy. The combination of read/write heads, head suspension arms, and E-block actuator is commonly known as a head stack assembly (HSA), and is illustrated in FIG. 1b.

In the typical operation of such disk drives, the head does not actually ride on the surface of the rotating disk but instead is separated by an extremely thin layer of air. As the disk rotates at high speeds (e.g. 5400 rpm), a thin air bearing (e.g. 2–4 micro inch) forms between the rotating disk and the slider. The slider is aerodynamically shaped so that the head effectively rides, or flies, on the air bearing, which tends to lift slider upward and away from the disk surface. To maintain a fixed distance between the head and disk, commonly referred to as "fly height", a continuous biasing force, commonly referred to as a "gram load" is applied to the head suspension arm urging the head toward the disk surface, thereby enabling the head to counteract the upward force of the air bearing. Typically, the gram load is approximately 3–6 grams, (as measured when the heads are contacting the disk), depending on the flying characteristics of the slider. The gram load is provided by incorporating a preloaded spring portion, e.g. a bend, to the suspension arm to bias the head toward the disk.

With the ever increasing demand for higher data storage capacity in disk drives, it has become even more essential to maintain the head at a constant low fly height above the disk. Hence, it is critical that the head stack assembly is manufactured with a proper gram load.

In the prior art, known systems for measuring gram load of the suspension arm were time and labor intensive. FIG. 1a shows a typical gram load measuring system 100. In the prior art, the system 100 included a computer 110 for storing gram load measurements, a gram load measuring instrument 130, and an apparatus 120 for manually placing each of the suspension arms of a head stack assembly into position to measure the gram load. FIG. 1c illustrates the apparatus 120, including a pin tower assembly 60 comprising a plurality of vertically aligned cam pins 62 for meshably engaging suspension arms 75 such as those of the head stack assembly 70 shown in FIG. 1b. As the pins and the suspension arms engage, shown in FIG. 1b, each cam pin 62 is situated between a top and bottom arm. Each cam pin 62 includes an L-shaped lever arm 64 integrally press fit at one end. Referring back to FIG. 1a, the incrementally varying lengths of the pins 62 form a step-like staggered array of levers, enabling each to be rotated without interference from adjacent levers. To measure the gram load of each arm, each lever arm had to be manually rotated. For example, each lever was first manually rotated 90 degrees in the clockwise direction, placing the top suspension arm in contact with a substrate (e.g. glass substrate), which prevented adjacent heads from contacting each other. The operator would then manually prompt the measuring apparatus 130, to measure the gram load in the suspension arm. Typically, the measuring apparatus included a load cell which was mounted to the substrate. Upon completion of measuring the gram load, the operator would then be required to manually prompt the computer 110 to store the gram load measurement. Then, the pin lever 64 is again manually rotated 180 degrees in the other direction, returning the top suspension arm to its original position, and placing the bottom suspension arm in contact with the adjacent substrate. Again the operator is required to manually prompt the measuring apparatus 130 to measure the gram load in the suspension arm, then prompt the computer 110 to store that measurement. This process of manually rotating the lever arm, then prompting the measuring apparatus 130 and the computer 110 is repeated until the gram load in every suspension arm is measured. Clearly the disadvantage of this prior art system is the time and labor consuming nature of the apparatus 120. In addition, the possibility of operator error adds to the drawbacks of the prior art system.

Thus, a hitherto unsolved need has remained for an automated system for measuring the gram load of a suspension arm in a head stack assembly which reduces operator dependency.

SUMMARY OF THE INVENTION

A general object of the present invention is to provide a system for measuring the gram load of each suspension arm in a head stack assembly in an automated manner overcoming limitations and drawbacks of the prior art.

A more specific object of the present invention is to provide an automated testing system for measuring gram load of a suspension arm in a head stack assembly which reduces manual assistance and error.

Another object of the present invention is to provide an apparatus for automatically placing each suspension arm in a head stack assembly into a measuring position which does not require manual assistance and is readily constructed and suitable for use during the head stack assembly process.

Yet another object of the present invention is to provide a controller for controlling the operation of the apparatus for placing each suspension arm into the measuring position in an automated mode, without manual assistance.

In accordance with the foregoing objects, the present invention is embodied in a four component system comprising a measuring instrument for measuring gram load in each suspension arm of a head stack assembly, an automated apparatus for placing each of the suspension arms into a measuring position, a controller for driving the automated apparatus, and a computer for storing data measured by the measuring instrument.

The automated apparatus further comprises a plurality of vertically aligned cam pins which meshably engage with the suspension arms, each of the cam pins includes an end defined by a semi-circular cross section and is rotatable about its longitudinal axis and driven by servo motors, placing each of the suspension arms into a measuring position.

BRIEF DESCRIPTION OF THE DRAWINGS

FIG. 3a is a top view of the cam pin tower assembly of FIG. 2.

FIG. 3b is a side elevation view of the cam pin tower assembly of FIG. 2.

FIG. 3c is an enhanced view of the cam pin—servo motor interface detailed in FIG. 3a.

FIG. 4a is a side elevation view of the cam pin of FIG. 2.

FIG. 4b is a front elevation view of the cam pin of FIG. 4a.

FIG. 4c is a rear elevation view of the cam pin of FIG. 4a.

DETAILED DESCRIPTION OF A PREFERRED EMBODIMENT

Figure 1A:
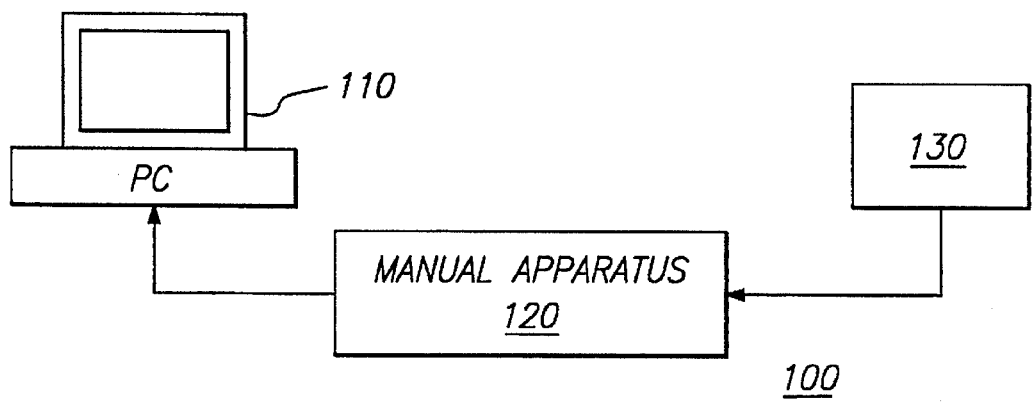
FIG. 1a is a schematic view of a prior art system for measuring gram load in a suspension arm of a head stack assembly.
Figure 1B:
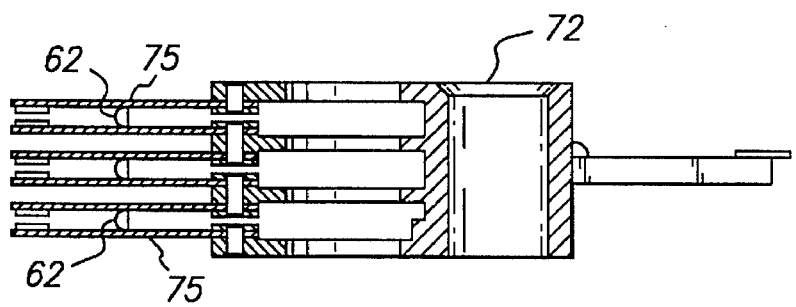
FIG. 1b illustrates a conventional head stack assembly.
Figure 1C:
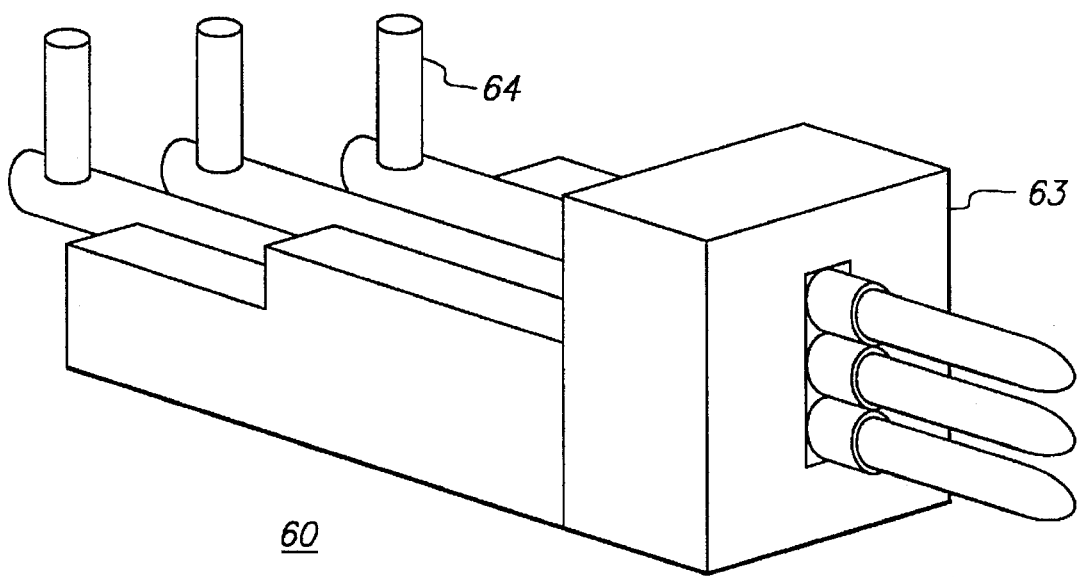
FIG. 1c illustrates the manual apparatus of FIG. 1a for placing a suspension arm of a head stack assembly into a measuring position.
Figure 2A:
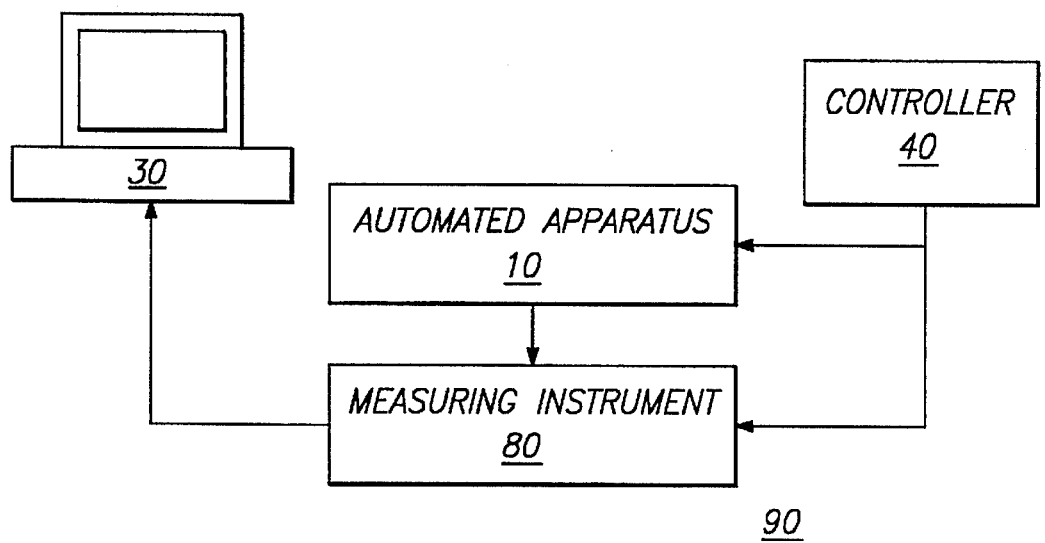
FIG. 2a is a schematic view of the automated gram load measuring system of the present invention.
Figure 2B:
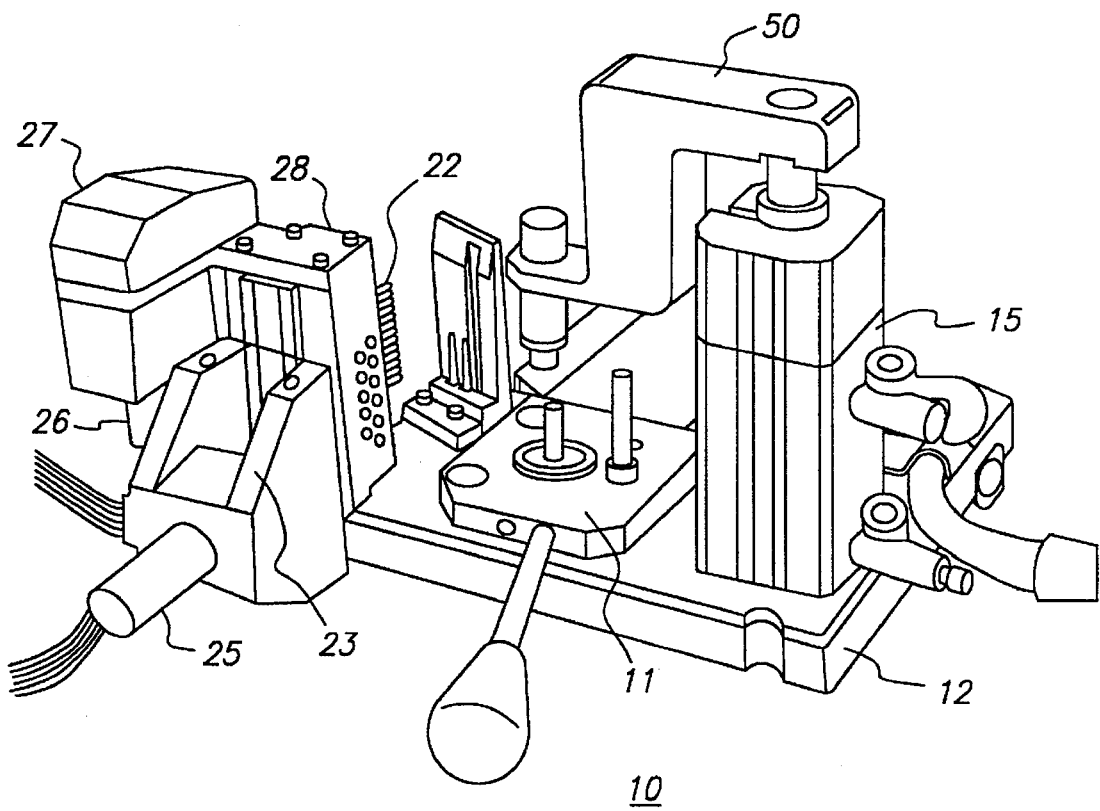
FIG. 2b is an isometric plan view of the automated apparatus of FIG. 2a for placing the suspension arms of a head stack assembly into a measuring position.

One preferred embodiment of the present invention, schematically represented in FIG. 2a, overcomes the time and labor intensive drawbacks of the prior art by eliminating the manual steps required in the manual apparatus. The automated system 90 includes a computer 30, a controller 40, a gram load measuring instrument 80 and an automated apparatus 10. The automated apparatus 10, illustrated in detail in FIG. 2b, includes a base 12, a cam pin tower assembly 20, a pneumatically actuated nest 11 defined by a pivotable platform having a shaft mounted therein, supporting an HSA, and a pivotable pneumatic clamp 50 for securing the HSA. The controller 40 controls 4 axes of motion which are involved in the automated operation of the apparatus 10 and includes a servo card which process signals received from various proximity sensors located throughout the apparatus 10. The computer 30, similar to that used in the prior art system, stores and displays data measured by the apparatus 10. The nest 11 is mounted on the base 12 adjacent the pin tower assembly 20 such that, when inserted in to the nest, an HSA may be pneumatically pivoted into meshed engagement with the plurality of pins 22. The pneumatic clamp 50 is pivotally actuated by air cylinder 15, which is in turn mounted to the base 12, adjacent the nest 11. The gram load measuring instrument 80 includes a load cell (not shown) such as a MAGNEBIT GRAMMER, made by Magnabit Corporation, or any such equivalent measuring instrument capable of being calibrated and measuring load forces in the order of 3–6 grams.

The cam pin tower assembly 20 shown in FIG. 3a and 3b, in combination with the controller 40 enables the present invention to eliminate the disadvantageous manual assistance required in the prior art system, and includes a plurality of vertically aligned cam pins 22, cam pin housing 28, lead screw servo motor 26, and cam pin servo motor 25, mounted integrally to slide bracket 23. FIG. 4 provides a detailed view of a cam pin 22, including a first end 22a, defined by a fiat rectangular-shaped tab, a cylindrical-shaped middle portion 22b, and a second end 22c, defined by a semi-circular cross-section. The pins 22 are securely encased by the housing 28 and contact each other. A ball plunger (not shown) is threadably inserted into the housing 28 and is situated against a detent 22d along the middle portion 22b of each pin to prevent neighboring cam pins from rotating when an adjacent cam pin is rotated.

Referring back to FIGS. 3a and 3b, lead screw servo motor 26 drives slide bracket 23 about its vertical axis along vertical slide rails (not shown), which are mounted to cam pin housing 28. Servo motor 26 is coupled to the bracket 23 by a lead screw 27, and coupling gears 21 and 21a. Controller 40 enables servo motor 25 and bracket 23 to be driven to positions along the slide rails corresponding to a particular cam pin 22. As shown in FIG. 3a, cam pin servo motor 25, includes a coupling flag 24 for engaging the first end 22a and rotating cam pin 22 (see FIG. 3c).

As with the apparatus of the prior art, a plurality of vertically aligned substrates is mounted to base 12 adjacent the pin tower 20 such that each substrate is in planar alignment with a cam pin 22. Each of the substrates 80 (shown in FIG. 5) is attached to the load cell in measuring instrument 80 and are weighted to zero grams. In the non-measuring mode, the suspension arms do not contact the substrate. Each substrate provides an extension of the load cell, enabling the load cell to measure the gram load of the suspension arms 75.

Figure 5A:
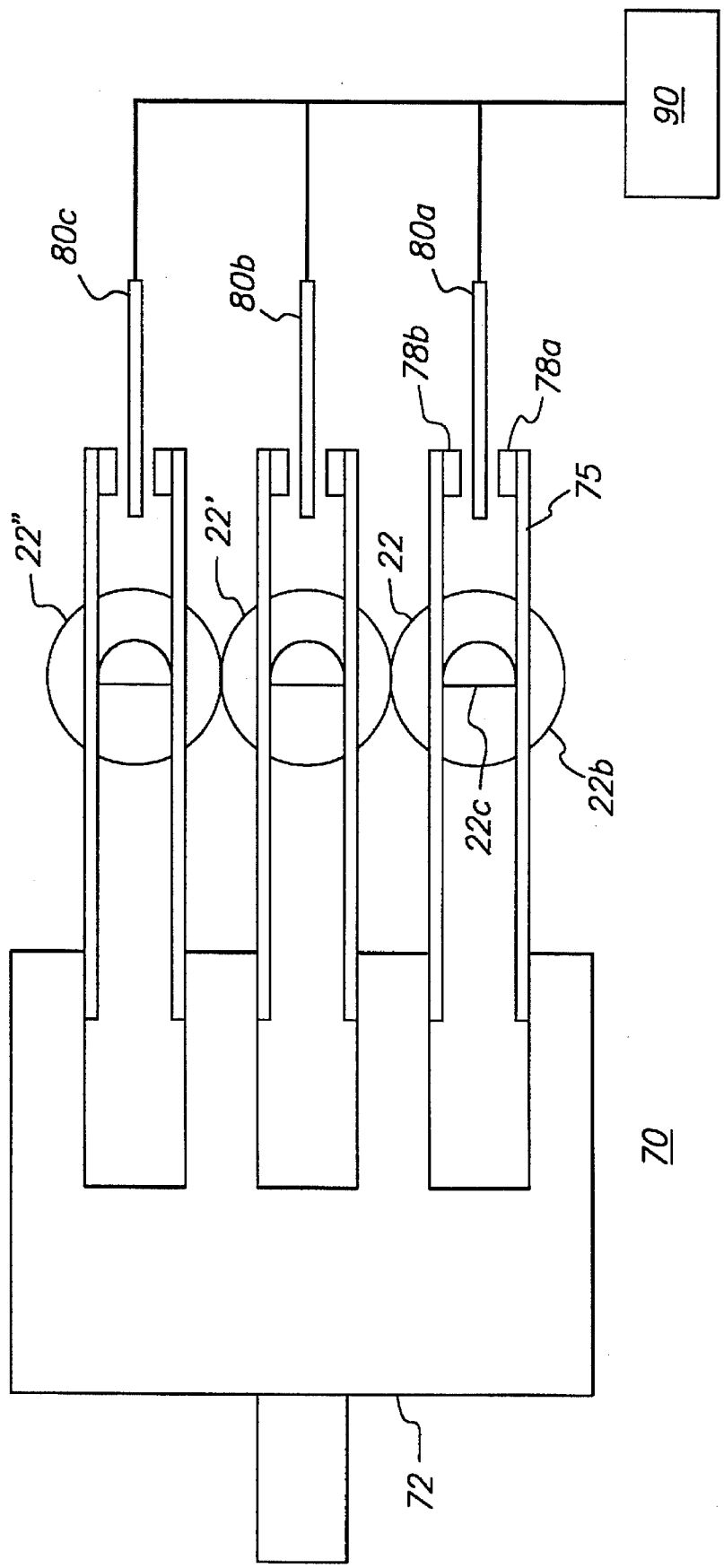
FIG. 5a is a side elevation view of the head stack assembly of FIG. 1a in meshed engagement with the pin tower of FIG. 3b, illustrating a home position of a pin.
Figure 5B:
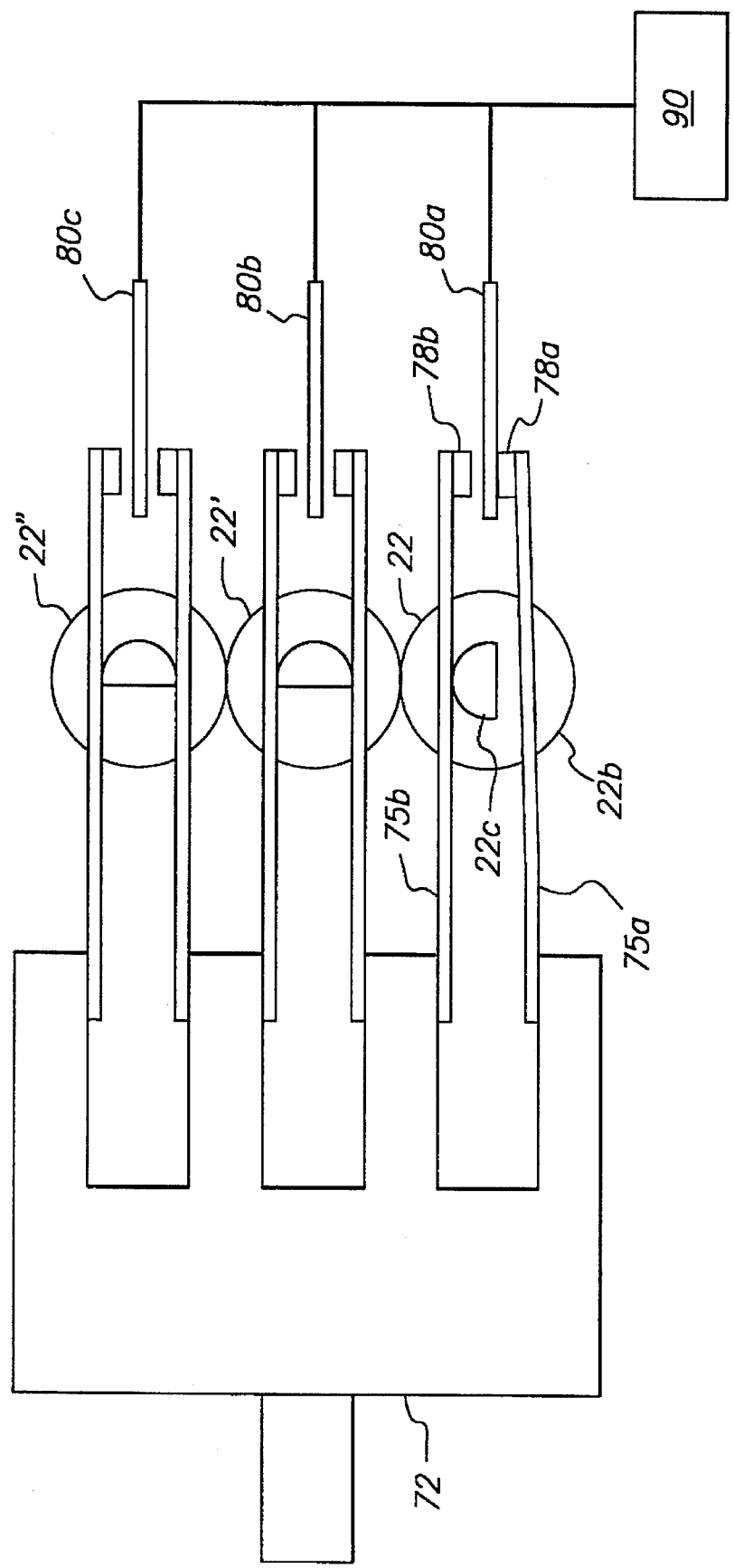
FIG. 5b is another view of FIG. 5a, illustrating a first position of a pin.
Figure 5C:
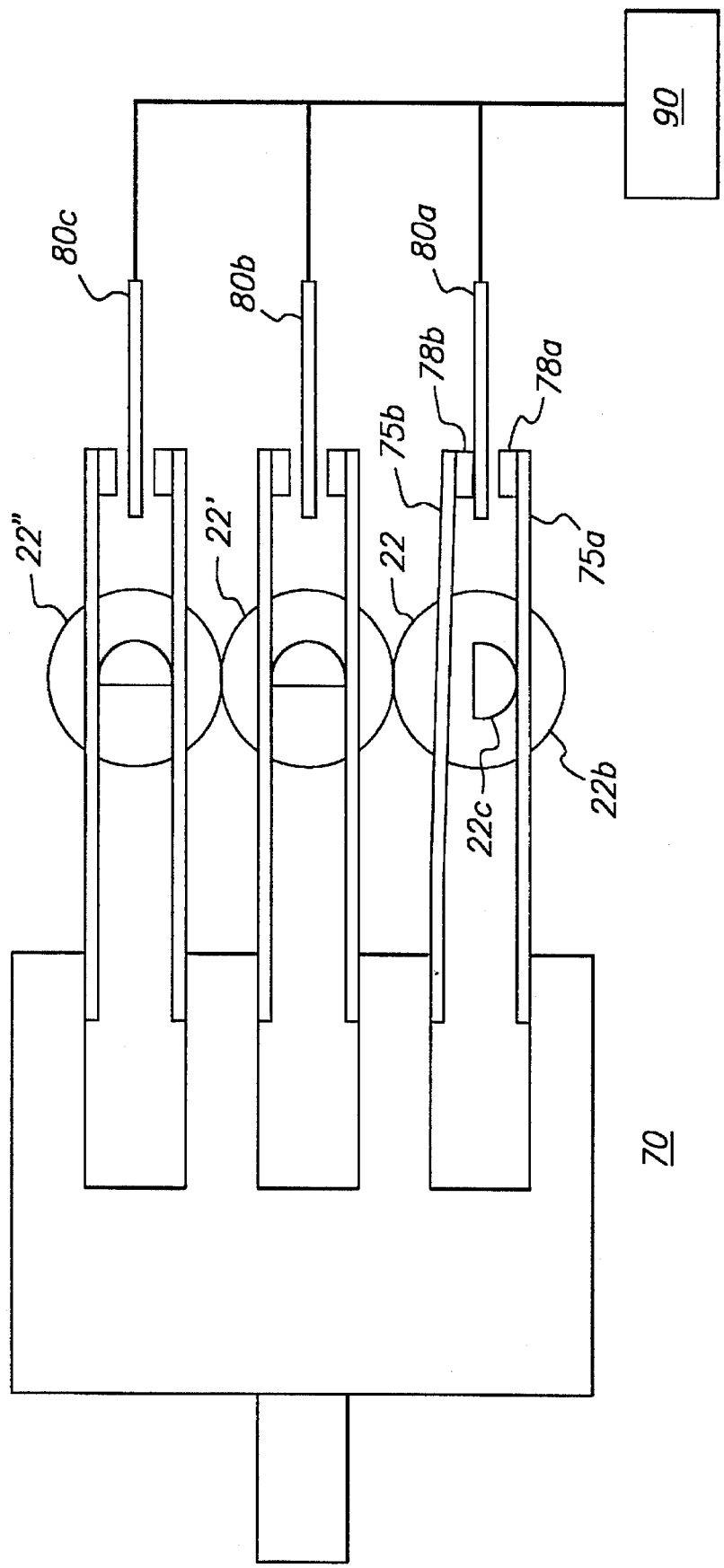
FIG. 5c is another view of FIG. 5a, illustrating a second position of a pin.

During operation, the HSA 70 is manually inserted into the nest 11. Thereafter, the requirement for manual assistance is virtually eliminated. The controller 40 then automatically clamps, then pivots the HSA 70 into meshed engagement with the stack of substrates 80 and the cam pins 22. As shown in FIG. 5a, in an illustrated embodiment of three cam pins 22, 22', and 22" and three substrates 80a, 80b, and 80c, each cam pin is situated between a pair of suspension arms 75a and 75b. Until the actual measuring mode of a particular suspension arm, the heads 78a and 78b do not contact the corresponding substrate. As illustrated in FIG. 5a, only the second end 22c portion of the cam pin 22 is actually inserted between suspension arms 75a and 75b. In FIG. 5a, the cam pins 22 are shown in a home position, biasing both adjacent heads 78 away from the substrates 80. Controller 40 initiates lead screw servo motor 26 to drive lead screw 27 to position cam pin servo motor 25 in alignment with the first cam pin 22 to be tested, typically it is the bottom most pin in the pin tower. Then, as shown in FIG. 5b, servo motor 25 rotates cam pin 22 ninety (90) degrees from the home position, to a first position, such that pin 22 is no longer in contact with suspension arm 75a, and placing arm 75a into a measuring position. At this first position, arm 75a returns to its preloaded biased state, placing head 78a in contact with substrate 80a, thereby registering a gram load on the load cell 90 through the substrate 80a. After the gram load of the arm 75a is measured and stored in the computer 30, an internal timer in the controller 40 is set off, initiating servo motor 25 to automatically rotate cam pin 22 to a second position, 180 degrees from the first position, shown in FIG. 5c. At this second position, the second end 22c of cam pin 22 resumes contact with arm 75a, biasing the arm 75a away from the substrate 80a while releasing contact with arm 75b, enabling arm 75b to return to its preloaded biased state and placing head 78b into contact with the substrate 80a. Again the gram load is measured by the load cell 80, through the substrate 80a, and the data transferred to be stored in the computer 30. The cam pin 22 is then automatically rotated to a position several degrees past home position, then back to home position, to account for backlash from the clearance between the coupling flag 24 and the first end 22a of a cam pin.

The controller 40 next automatically indexes the cam pin servo motor 25 to the next cam pin 22, and the measuring sequence described above is repeated. Upon measuring the other suspension arms in the HSA 70, the controller automatically pivots the HSA 70 back to the unload position, releases clamp 50, then returns servo motors 25 and 26 to an unload position. The controller may be programmed to accommodate any size HSA and any number of suspension arms.

The number of pins in the cam pin tower varies depending on the size of the head stack assembly. For the purposes of illustration, the cam pin tower 20 is shown in an embodiment with three pins, corresponding to three pairs of suspension arms. Those skilled in the art will understand that a modification in the number of cam pins to accommodate different sized HSA's is encompassed within the scope of this invention.

Because clearances and tolerances between the cam pins and the suspension arms are critical for accurate gram load measurements, precise machining is the preferred method of fabricating the various parts of present invention, particularly the cam pins.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. Specifically, it should be understood that the scope of the present invention is in no way limited by the number of cam pins. The disclosure and the description herein are purely illustrative and are not intended to be in any sense limiting.

What is claimed is:

1. An automated testing apparatus for a head stack assembly including an E-block, a plurality of vertically aligned head suspension arms being mounted to the E-block, the suspension arms supporting a plurality of magnetic heads, each of the suspension arms being biased with a gram load to a first position, the apparatus comprising:
   a base;
   a stationary shaft mounted onto the base, the head stack assembly being insertably rotatable about the shaft;
   means for presenting each of the suspension arms into the first position for measuring the gram load without requiring manual assistance;
   a measuring means for measuring the gram load of each suspension arm without requiring manual assistance;
   a controller means for initiating the measuring means to measure each suspension arm and for aligning the measuring means with each suspension arm without requiring manual assistance; and
   a storage means for collecting and storing the gram load measured from each suspension arm without requiring manual assistance.

2. The automated testing apparatus of claim 1 wherein the means for presenting each of the suspension arms comprises:
   a pin tower assembly mounted to the base comprising a plurality of vertically aligned cam pins, each cam pin being rotatable about a longitudinal axis, between a first angle, a second angle and a third angle;
   means for rotating the head stack assembly from an unload position, once the head stack assembly is inserted onto the shaft, to a testing position wherein the plurality of head suspension arms are meshably engaged with the pin tower assembly such that each of the plurality of cam pins is projected between adjacent pairs of suspension arms, biasing the suspension arms into a second position; and
   means for rotating the cam pins from the first angle to the second, placing a first adjacent arm from the second position back to the first position, and for rotating the cam pins from the second angle to the third angle, placing the first adjacent arm into the second position while placing a second adjacent arm from the second position back to the first position.

3. The automated testing apparatus of claim 1 wherein the means for measuring the gram load comprises a substrate attached to a load cell.

4. The automated testing apparatus of claim 2 wherein the means for rotating the cam pins comprises a lead screw motor assembly and a cam pin motor assembly.

5. The automated testing apparatus of claim 4, wherein the cam pin motor assembly comprises a first servo motor, a housing and a rotatable forked coupler driven by the first servo motor, for engaging and rotating one of the cam pins, the cam pin motor assembly being moveable in a vertical axis along a vertical cross roller slide.

6. The automated testing apparatus of claim 4 wherein the lead screw motor assembly comprises a lead screw housing, a second servo motor coupled to and driving a lead screw, the lead screw further coupled to the cam pin motor assembly such that the lead screw motor assembly drives the cam pin motor assembly along the vertical cross roller slide to a specified cam pin.

7. The automated testing apparatus of claim 1 further comprising means for clamping the head stack assembly onto the shaft and pivoting the head stack assembly without requiring manual assistance.

8. An automated testing apparatus for a head stack assembly including a rotatable E-block, a plurality of vertically aligned head suspension arms mounted to the E-block, the suspension arms supporting a plurality of magnetic heads, each of the suspension arms being biased with a gram load to a first position, the apparatus comprising:
   a base;
   a stationary shaft mounted onto the base, the head stack assembly being insertably rotatable about the shaft;
   a pin tower assembly mounted to the base comprising a plurality of vertically aligned cam pins, each cam pin being rotatable about a longitudinal axis, between a first angle, a second angle, and a third angle;
   a first rotating means for rotating the head stack assembly from an unload position, once the head stack assembly is inserted onto the shaft, to a testing position wherein the plurality of head suspension arms are meshably engaged with the pin tower assembly such that each of the plurality of cam pins is projected between adjacent pairs of suspension arms, biasing the suspension arms into a second position;

a second rotating means for rotating the cam pins from the first angle to the second, placing a first arm from the second position to the first position, then to the third angle, placing a second arm from the second position to the first position while returning the first arm from the first position to the second position;

a measuring means for measuring and recording the gram load when each of the arms is placed into the first position;

a controller means for driving the means for rotating the head stack assembly and for driving the means for measuring and recording, without requiting any manual assistance; and a storage means communicating with the measuring means for collecting and storing the gram load measured from each suspension arm without requiting manual assistance.

9. The automated testing apparatus of claim 8 wherein the second rotating means for rotating the cam pins comprises a lead screw motor assembly and a cam pin motor assembly.

10. The automated testing apparatus of claim 9, wherein the cam pin motor assembly comprises a first servo motor, a housing and a rotatable forked coupler driven by the first servo motor, for engaging and rotating one of the cam pins, the cam pin motor assembly being moveable in a vertical axis along a vertical cross roller slide.

11. The automated testing apparatus of claim 9 wherein the lead screw motor assembly comprises a lead screw housing, a second servo motor coupled to and driving a lead screw, the lead screw further coupled to the cam pin motor assembly such that the lead screw motor assembly drives the cam pin motor assembly along the vertical cross roller slide to a specified cam pin.

12. A method of measuring gram load of a rotatable head stack assembly including an E-block, a plurality of vertically aligned head suspension arms mounted to the E-block, the suspension arms supporting a plurality of magnetic heads, each of the arms being biased with a gram load, the method comprising the steps of:

clamping the head stack assembly onto a shaft mounted on a base;

rotating the head stack assembly into a testing position such that the head suspension arms meshably engage the plurality of vertically aligned cam pins such that each cam pin projects between a pair of adjacent arms, biasing the arms to a first position;

driving a lead screw motor to index a cam pin motor assembly along a vertical cross roller slide to a position corresponding with one of the cam pins;

driving a cam pin motor in the cam pin motor assembly to rotate the cam pin to a first angle such that a first arm of the adjacent pair of arms is biased to a second position while the second arm remains biased in the first position;

measuring the gram load in the first arm;

driving the cam pin motor to rotate the cam pin to a second angle such that the first arm is biased back to the first position and the second arm is biased to the second position;

measuring the gram load in the second arm; and executing the steps of clamping, rotating, driving and measuring in sequence without requiring manual assistance.

13. The method of claim 12 wherein the load force is measured by a load cell including a plurality of vertically aligned substrates connected thereto.

14. The method of claim 12 wherein the measured gram load is collected and stored in a computer.

15. The method of claim 12 wherein the step of executing the steps of clamping, rotating, driving, and measuring is controlled by a controller means.

* * * * *